United States Patent
Chodroff et al.

(10) Patent No.: US 7,966,614 B2
(45) Date of Patent: Jun. 21, 2011

(54) CONTROLLING AN AVAILABILITY POLICY FOR A VIRTUAL MACHINE BASED ON CHANGES IN A REAL WORLD ENVIRONMENT

(75) Inventors: Benjamin Evans Chodroff, York, PA (US); Adam S Edelstein, Austin, TX (US); Richard Edwin Harper, Chapel Hill, NC (US); Mangesh Kanaskar, Mableton, GA (US); Wayne Frederick Schildhauer, Cary, NC (US); Megan Susanne Schneider, Morrisville, NC (US); Lorrie A Tomek, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 11/782,630

(22) Filed: Jul. 24, 2007

(65) Prior Publication Data

US 2009/0031307 A1 Jan. 29, 2009

(51) Int. Cl.
- G06F 9/455 (2006.01)
- G06F 11/00 (2006.01)
- G06F 11/07 (2006.01)

(52) U.S. Cl. .................................. 718/1; 714/1; 714/2

(58) Field of Classification Search ....... 718/1; 714/1–2
See application file for complete search history.

(56) References Cited

U.S. PATENT DOCUMENTS

| | | | |
|---|---|---|---|
| 4,866,712 A * | 9/1989 | Chao | 714/704 |
| 7,246,254 B2 * | 7/2007 | Alur et al. | 714/2 |
| 2006/0085668 A1 * | 4/2006 | Garrett | 714/4 |

* cited by examiner

Primary Examiner — Qing Wu

(57) ABSTRACT

Management of a virtual machine is enhanced by establishing an initial availability policy for the machine. Once the virtual machine is invoked, the real environment for the virtual machine is monitored for the occurrence of predetermined events. If a real environment event is detected that could affect the availability of the virtual machine, the availability policy of the virtual machine is automatically adjusted to reflect the new or predicted state of the real environment.

20 Claims, 4 Drawing Sheets

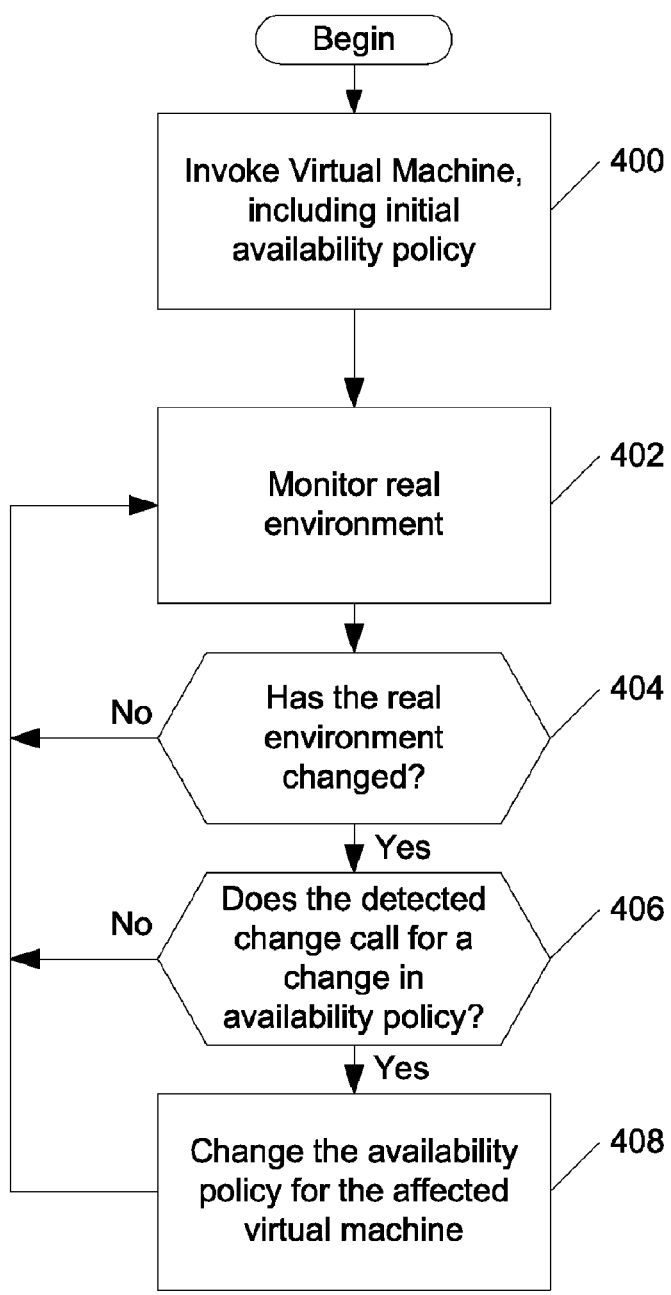

CONTROLLING AN AVAILABILITY POLICY FOR A VIRTUAL MACHINE BASED ON CHANGES IN A REAL WORLD ENVIRONMENT

BACKGROUND OF THE INVENTION

The present invention relates to data processing and more particularly to a method, system and program product for managing a virtual machine.

The concept of virtualization is an extremely significant one in the field of data processing. Generally speaking, virtualization is a broad concept that is commonly associated with partitioning of real data processing resources; i.e., making a single data processing resource, such as a server or data storage device or operating system or application, appear to function as multiple logical or virtual resources. The concept is broad enough to also include aggregation of real data processing resources; i.e., making multiple physical resources, such as servers or data storage devices, appear as a single logical resource.

There are numerous reasons for using virtualization concepts in data processing. Virtual machines can be used to consolidate workloads of different servers to fewer machines, which may reduce both hardware costs and the costs of administering and maintaining the needed server infrastructure.

Virtual machines also make it easier to control the reallocation of real resources where one or more applications running on a real resource, such as a server, has a cyclical demand profile. For example, a server located on the East coast of the United States might run, among other things, a phone number lookup application. The demands of such an application will be tied closely to the time of day and day of the week with peak usage likely to occur between 9:00 AM and 5:00 PM Monday through Friday and minimum usage likely to occur between midnight and 6:00 AM and on Saturdays and Sundays.

Running such applications in virtual machines makes it easier to shut down unneeded virtual machines during periods of minimum use, which allows real resources to be released for other purposes; e.g., batch processing of transaction data. Similarly, where virtual machines are running on several different underutilized hosts, a situation that can occur during off-peak hours for a virtual machine application, costs may be saved by consolidating those virtual machines onto a single host and shutting down the other hosts.

Virtual machines can be used in load balancing (load sharing) applications where multiple servers are used to share multiple user requests to access a common application or data repository. A number of well-known techniques are used to distribute the user requests among the servers with a goal of avoiding overloading a single server.

Legacy applications (that is, applications developed for an earlier generation of software or hardware products) may be accommodated on a virtual machine configured to have the appearance of the earlier generation of products long after those products are no longer available, at least available to the system operator with a need to run the legacy application.

Virtual machines support debugging and performance monitoring of both hardware and software, including operating systems. Debugging tools and performance monitoring tools can be run in a virtual machine that is isolated from the hardware or software being debugged or tested.

Virtual machines can be configured with read/write/access restrictions that provide secure, isolated environments, often referred to as sandboxes, for running untrusted applications. Because virtual machines configured this way can isolate what they run, they provide fault and error containment. Faults, both unexpected ones and those deliberately injected into the machine environment during testing, can be handled without significantly jeopardizing the physical resources used in implementing the virtual machine or a set of virtual machines.

Where used for resource aggregation, virtual machines can enable a system operator to aggregate the capabilities of multiple physical devices (for example, data storage devices, in order to manage a workload that would overwhelm any one of the multiple physical devices.

The above-list is not intended to be exhaustive as there are many other reasons for using virtualization in implementing solutions to data processing problems.

A virtual machine is managed in part in accordance with an availability policy that defines how the virtual machine will deal with both predicted events (predicted failures), expected/scheduled events (such as planned maintenance shutdowns) and unpredicted events such as failures of one or more of the real resources that support the virtual machine operation. The policy that defines virtual machine response to predicted and expected/scheduled events is often referred to as the migration policy for the virtual machine. The policy that defines how the virtual machine will deal with unpredicted events or actual failures is often referred to as the recovery policy for the virtual machine.

A standard practice has been for a system administrator to initially define the availability policy for a particular virtual machine and to manually make any desired changes in that availability policy once the initial policy had been established. This involves overriding defaults for a cluster, a node, and individual machines in a repetitive manner.

BRIEF SUMMARY OF THE INVENTION

Management of a virtual machine is improved by defining an initial availability policy for the virtual machine. When the virtual machine management system is started the real environment of the machine is monitored for the occurrence of predetermined events. When a VM is started it is registered into the managing system as a resource to be monitored and controlled. When one of the predetermined events is detected, the availability policy of the virtual machine is altered in a response to the detected event.

BRIEF DESCRIPTION OF THE SEVERAL VIEWS OF THE DRAWINGS

While the specification concludes with claims particularly pointing out and distinctly claiming that which is regarded as the present invention, details of embodiments of the invention may be more readily ascertained from the following detailed description wherein:

FIG. 3 is a block diagram representation of an availability policy that is used to govern the operation of a virtual machine;

FIG. 4 is a flow chart of operations performed in governing a virtual machine in accordance with the present invention.

DETAILED DESCRIPTION OF THE INVENTION

Figure 1:
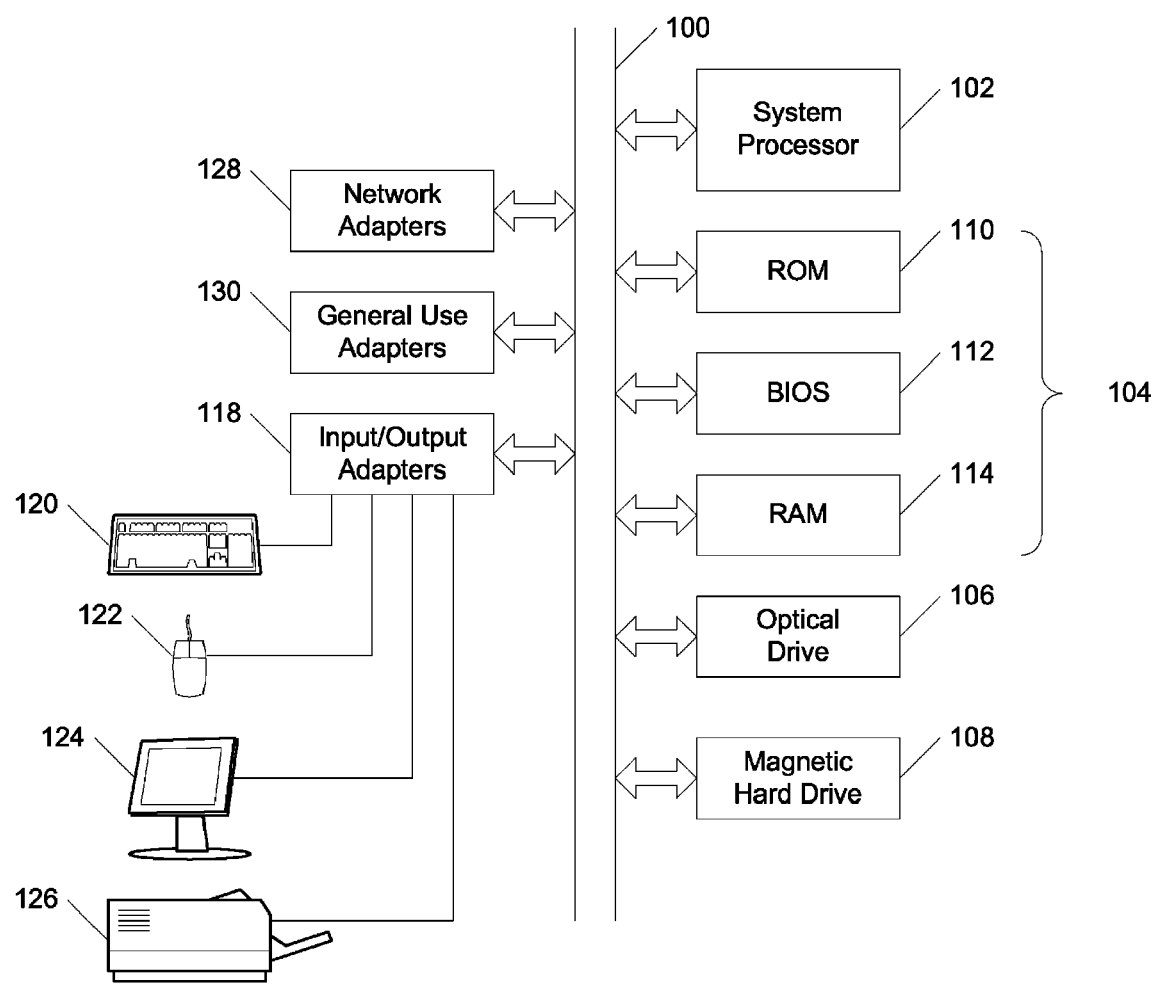
FIG. 1 is a schematic diagram of a real data processing machine on which one or more virtual machines might be implemented and managed in accordance with the present invention.

A virtual machine is implemented by programming a real machine or general purpose computer system of the type shown briefly in FIG. 1.

A typical general purpose computer system includes an internal system bus 100, a system processor 102, internal memory components 104 and one or more "external" memory components, such as an optical drive 106 and a magnetic hard drive 108. The internal memory 104 includes specific types of memory such as read only memory (ROM) 110, basic input/out system (BIOS) memory 112 and random access memory (RAM) 114. The BIOS 112 stores configuration information for the computer system and basic routines used to control the transfer of information among the components of the computer system.

Drives, such as optical drive 106 and hard drive 108, provide non-volatile storage for applications and processes that execute in the computer system and for data used in and/or generated by those applications and processes. Depending on the technology employed, the drives may include removable media. The special purpose programming needed by a computer system to implement the described invention would typically be stored in one of these drives and transferred as needed into RAM 114. Local drives, such as those discussed above, may be supplemented by network-accessible drives.

The computer system also includes a significant number of input/output (I/O) adapters 118 that provide interfaces between a variety of input/output devices and the remainder of the computer system. Common examples of input/output devices include keyboard 120, mouse 122, monitor 124 and printer 126.

The computer system can be connected to other systems through network adapters 128, which may support wired or wireless network connections. Finally, the computer system may include what are characterized as general use adapters that can be used for a number of different purposes. For example, USB (Universal Serial Bus) adapters can be used to connect typical input/output devices (such as keyboards, monitors, etc.), auxiliary memory devices, such as flash memory cards, portable hard drives and even high capacity magnetic hard drives, wireless network transceivers and many other kinds of devices to the computer system.

It should not be inferred that only the devices shown in the drawing or discussed above can be part of the computer system. There are simply too many different types of devices to include in a drawing. Moreover, it should not be implied that the input/output adapters or general use adapters are limited to technology mentioned. There are many different types of device adapters to include all in the drawing. Current examples of port technologies that are successfully used include not only USB, but also serial ports, parallel ports, SCSI, FireWire ports and infrared ports. Other port technologies undoubtedly already exist or will be developed.

Virtual machine concepts are implemented in a general-purpose computer system of the type described above by running special software in the system to create a software component commonly referred to as a Virtual Machine Monitor (VMM), or hypervisor.

Figure 2:
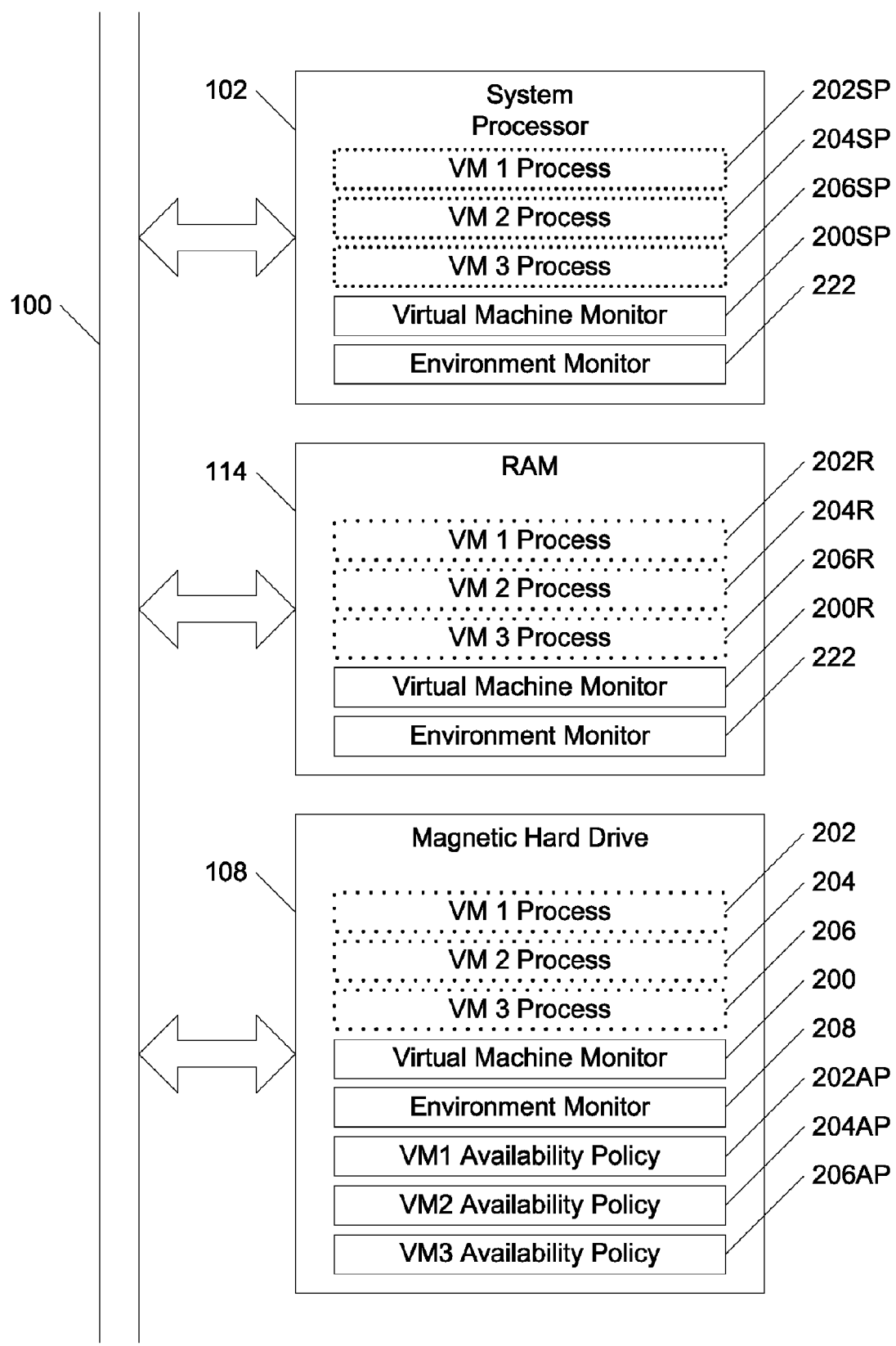
FIG. 2 is a schematic diagram of a portion of the real data processing machine including representations of multiple virtual machines implemented using the resources of the real data processing machine.

FIG. 2 is a more detailed view of a portion of the general purpose computer system already described with reference to FIG. 1. FIG. 2 shows the system bus 100, system processor 102, magnetic hard drive 108, and RAM memory 114, all of which play significant roles when the general-purpose computer system is used to create and manage virtual machines.

Until it is executed, VMM software 200 is stored on magnetic hard drive 108 like any other software to be executed in the computer system. Once the VMM software 200 is invoked, elements 200R of the code are loaded into RAM memory 114 and are executed (as elements 200SP) by the system processor to define and manage one or more virtual machines.

The states of the code 200R stored in RAM 114 and 200SP being executed in the system processor 102 along with data stored on magnetic hard drive 108 define one or more virtual machines 202-204. The virtual machines can be thought of as a number of parallel software processes 202SP-206SP and 202R-206R co-existing in system processor 102 and RAM 114, respectively, using data and code retrieved from and sent to the hard drive 108.

An important component in the definition of the virtual machine is its availability policy, which governs how the machine responds to both expected events (e.g., planned shutdowns), unexpected events (e.g., a catastrophic failure of one or more of the hardware components of the real system in which the virtual machine is implemented, weather-related power outages, etc.), and physical conditions (e.g., power use that could be avoided by consolidating virtual machines onto fewer hosts). For purposes of illustration only, FIG. 2 shows availability policies 202AP-206AP for each of the virtual machines defined by the Virtual Machine Monitor 200.

FIG. 3 is a schematic representation of an availability policy 300 with the two major components of that policy being a migration policy 302 which defines how the virtual machine responds to expected events and a recovery policy 304 which defines how the virtual machine responds to unexpected events.

A recovery policy can specify one of several options in defining how a virtual machine responds to unexpected events. One option is simply to do nothing upon detection of the event. A second option is to restart the virtual machine beginning with the last image of the virtual machine stored on the hard drive. A third option is to employ checkpointing. In checkpointing both the state of the hard drive and of machine memory are periodically captured. This rate is set by the checkpointing Rate. If the virtual machine must be restarted, it can resume operation from the last checkpoint.

While the use of checkpointing is advantageous in that it enables the virtual machine to resume operations relatively quickly with minimum loss of data, it comes with a cost. Saving the check-point degrades system performance as a certain number of processor cycles and a certain amount of memory space must be allocated to the checkpointing process rather than to the processes for which the virtual machines are defined. The performance hit impacts all of the processes (and thus all of the virtual machines) running on the physical machine, not just the virtual machine for which the check point is being saved.

Depending on the amount of RAM available in the physical machine and on the size of the hard drive, it is conceivable that use of checkpointing would limit the size and/or number of virtual machines that could be implemented. At least in theory, the possibility exists that all of the physical resources of the machine would be dedicated to performance of the checkpointing process with no resources left over for performing the processes for which the virtual machines were defined.

Because of the potential impact on machine performance, it is desirable to limit the use of checkpointing to the extent possible.

Migration policies determine how the system handles predicted failures, scheduled migrations (transfer of the virtual machine from one set of physical resources to another) and user-initiated migrations. Recognized migration options include doing nothing, restarting the virtual machine after migration using the last saved image of the machine, inactive migration and active migration.

In an inactive migration process, a virtual machine is paused and its memory image is copied to an image file on a hard drive or other disk. The image file is transferred to another node and virtual machine operation is resumed from the transferred image file. The virtual machine is unavailable during the pause and image file transfer.

Active migration is a process by which a running virtual machine and its memory image is copied to another physical machine while continuing to run. Once the copy is complete and both virtual machines have the same system state and memory, the original virtual machine is deleted and the copy virtual machine takes over operations.

While active migration increases the chances that virtual machine services will continue to be provided to users without noticeable interruption, active migration also requires heavy demands on system resources, potentially leading to system performance degradation. Inactive migration places fewer demands on system resources but increases the chances of a service interruption that would be noticeable to users.

As noted earlier, availability policies have been created by system administrators and changed by those same system administrators whenever they deemed it appropriate. As a result, availability policies for virtual machines have been largely static and inflexible. The present invention reduces this inflexibility by monitoring the real environment in which a virtual machine is implemented. Upon detection of predetermined changes in its real environment, the availability policy for a particular virtual machine can automatically be altered to improve overall system performance while also streamlining and simplifying user-specified policy changes. Details of the monitoring process and the types of changes that can be made in availability policies are discussed below.

Referring back to FIG. 2, an environment monitor includes a software component 208 defined by code stored on the hard drive 108. When the environment monitor is in use, code components 208R and 208SP exist in RAM 114 and the system processor 102, respectively.

The primary function of the environment monitor is to monitor the real environment of the virtual machine and to make adjustments in the current availability policy of a virtual machine upon detection of predetermined changes in the real environment. The term "real environment" is not intended to be limited to the physical system on which a virtual machine is implemented. The term can be extended to other systems in the cluster including the physical system or even to being "real world" environment beyond the data processing environment. Events which take place in the "real world" can profoundly affect the operation of the physical system that implements the virtual machine and thus the operation of the virtual machine itself. Examples are provided later.

An objective of the invention is to be able to automatically alter the availability policy of a virtual machine so as to allocate a level of real resources to virtual machine operation that is appropriate for the current or anticipated real environment in which the virtual machine is implemented. If the current or anticipated real environment is such that the risk of a virtual machine failure is heightened, then the availability policy is adjusted to decrease the likelihood of a failure, minimize downtime and data loss should a failure occur and insure that all virtual machines have somewhere to be migrated.

In one embodiment, a four tier availability model is established and specific migration and recovery policies are associated with each of the tiers. The table below summarizes that four tier availability model.

| Availability Level | Migration Policy | Recovery Policy |
| --- | --- | --- |
| Tier 1 | None | None |
| Tier 2 | Restart | Restart |
| Tier 3 | Inactive Migration | Restart CheckPoint |
| Tier 4 | Active Migration | Restart CheckPoint |

Higher tier numbers are associated with higher levels of virtual machine availability; i.e., increased uptime and decreased interruption of service but also higher levels of dedication of real resources required to perform the processes that insure the higher levels of availability.

Lower tier numbers are associated with greater risks of virtual machine downtime and of interruption in services but also with use of fewer system resources to support virtual machine availability. There are times when it will be considered acceptable to implement a virtual machine with a lower tier availability policy simply because the benefits of preserving system resources for other uses are considered greater than the cost of a lower level of availability of the virtual machine.

As an example, if a virtual machine is used to run a mail server for a local site of a multinational corporation, it is important to have that mail server available during normal working hours at the site but less important to have that mail server available during the nighttime hours at the site. Outside of normal working hours, email traffic can be expected to be lighter and subtle increases in latency in the event of a failure are less likely to be noticed.

In this situation, the mail server might operate at a Tier 3 or Tier 4 level of availability during normal working hours but automatically be scaled back to a Tier 2 level of availability outside of normal working hours to free up system resources that might be used for other purposes, such as batch processing of data processing jobs at the local site or in support of processing being performed "live" at other remote corporate sites.

Similarly, if the environment monitor detects that an unacceptable number of physical servers have failed or have been taken out of service for some other reason, the remaining virtual machines can automatically be assigned a higher tier availability policy to improve the probability that those virtual machines will be restarted more quickly if they also fail and that data losses will be minimized even if the remaining virtual machines fail and cannot be restarted or migrated.

Conversely, if a failure has occurred, the environment monitor can detect the system resources that are available to restart the virtual machine and determine whether those resources are sufficient to re-establish the pre-failure availability level when the virtual machine is restarted. If the system resources are insufficient to establish the pre-failure availability policy, then a lower tier, less resource-demanding availability policy can be established during the virtual machine restart.

FIG. 4 is a flow chart of the basic process for automatically adjusting the availability policy of a virtual machine as a function of changes in the real environment of that virtual machine. The initial step 400 is to invoke the virtual machine using real system resources. Part of the invocation process is to establish an initial or default availability policy for the machine.

Once the virtual machine is running, the real environment of the machine is monitored at step 402. As noted above, the term "real environment" includes at least local system resources and may include system resources located elsewhere in the cluster that supports the virtual machine or in other systems, the performance of which may have an impact on the virtual machine.

Until a change in the real environment is detected in step 404, the monitoring continues without any adjustments being made in the availability policy. When a change is detected in the real environment, a determination is made in step 406 whether the change is one that justifies an adjustment in the of availability policy of the virtual machine.

If the change is justified, the availability policy is changed in step 408 and the monitoring of the real environment continues. It should be noted that the change in availability policy does not mean that the operations performed by the virtual machine will change. In fact, the operations of the virtual machine should continue without change.

What will change is the allocation of system resources required to implement the new availability policy. As an example, assume that the virtual machine had been operating at a tier 2 level of availability. At that level, both the migration and recovery policies would call for the virtual machine to be restarted "from scratch" from an image stored on a hard drive. Also, assume that a change in a real environment had occurred that justified raising the availability level of the machine from tier 2 to tier 3. At a tier 3 level of availability, an inactive migration policy and a restart-check point recovery policy would be implemented. Both of those policies require a greater use of system resources in order to gather the data required for successful execution, if either policy ever has to be executed.

Figure 5:
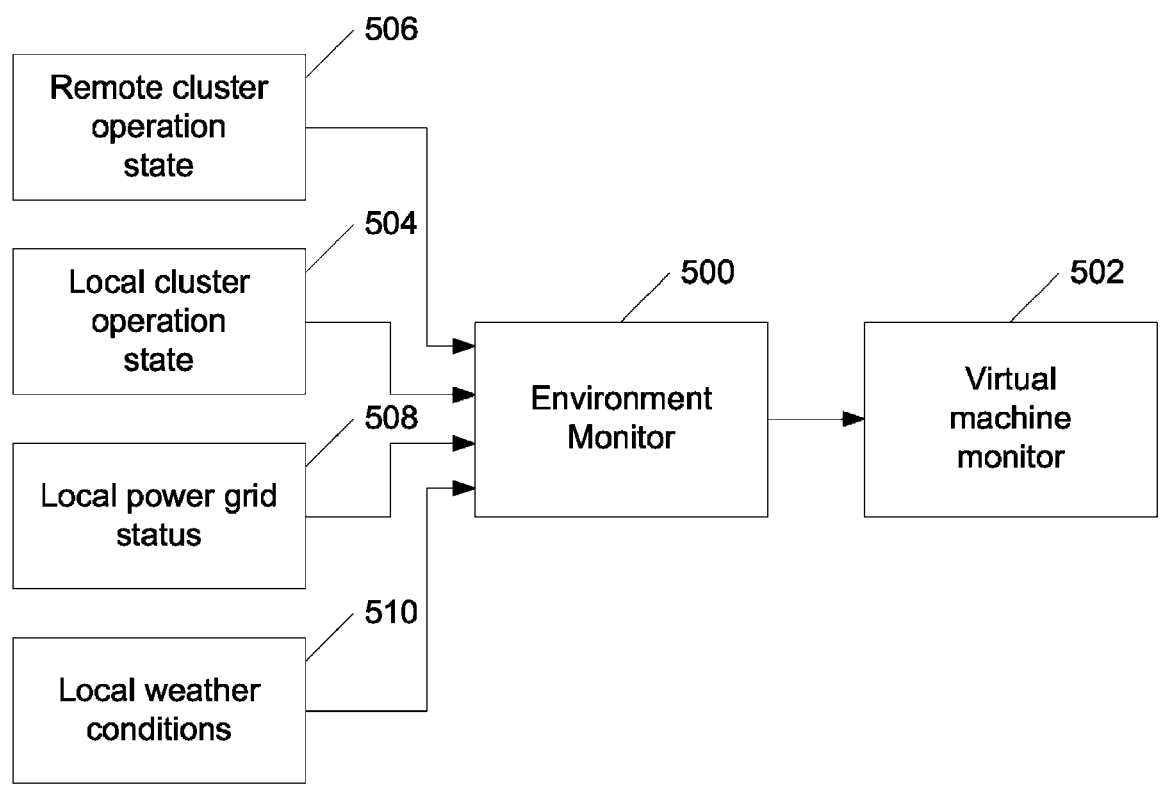
FIG. 5 is a schematic representation of an environment monitor and some of the possible sources of environment information that would be supplied to that monitor in an implementation of the present invention.

Referring to FIG. 5, an environment monitor 500 is shown connected to a virtual machine monitor 502. The real environment monitored by environment monitor 500 includes a number of different things. First, the real environment includes the current and predicted operating states 504 of the system resources included in the local cluster that supports virtual machine operation; e.g., the number of other virtual machines concurrently being supported, the workloads imposed by those machines, the availability of memory devices in the cluster, etc.

Beyond that, the real environment for a virtual machine invoked by monitor 502 can include current and predicted operating states 506 of remote clusters or systems if those remote clusters or systems may compete under some conditions for the system resources supporting the virtual machine. For example, if the remote system operates under a policy which allows it to commandeer resources in the local system upon certain kind of failures in the remote system, then the operating state of the remote system can impact execution of the virtual machine invoked by monitor 502. For that reason, it may be desirable to initiate a change in the availability policy of the local virtual machine in response to changes in the operating state of the remote system.

The real environment of a virtual machine is not just limited to the data processing environment of that machine. Power consumption of local computing resources may affect selection of an availability policy. Underutilized or overutilized virtual machines can be consolidated onto or redistributed to a minimum number of hosts needed to provide necessary services while minimizing power consumed by the host machines.

The current state of the local power grid may be important in selecting the appropriate availability policy. If there is an increased possibility of blackouts due to high system demand, it may be appropriate to increase the availability level of the virtual machine to a higher tier to minimize any interruption in the virtual machine services if a blackout does occur.

Finally, even if the local power grid is working fine, there is always a possibility that the local system will be affected by blackouts or a power surge due to electrical storms. To guard against these possibilities, the environment monitor 500 can receive feeds 510 of local weather conditions and raise the availability level of the virtual machine if threatening weather is a possibility.

While details of an embodiment of the invention have been described, variations and modification in that embodiment will occur to those skilled in the art once they learn of the embodiment. Therefore, it is intended that the appended claims shall be construed to include not only the embodiment described herein but also all such variations and modifications as fall within the true spirit and scope of the invention.

What is claimed is:

1. A method of managing a virtual machine comprising the steps of:
   a. establishing an availability policy for the virtual machine;
   b. monitoring a real world environment in which the virtual machine is implemented; and
   c. altering the availability policy of the virtual machine upon the detection of predetermined changes in the real world environment.

2. A method as set forth in claim 1 wherein the availability policy comprises a recovery policy defining actions to be taken upon detection of an unexpected predetermined change in the real world environment.

3. A method as set forth in claim 2 wherein the availability policy comprises a migration policy defining actions to be taken upon detection of an expected predetermined change in the real world environment.

4. A method as set forth in claim 3 including the further step of performing a checkpointing process defined by the availability policy and the step of altering the availability policy further includes the step of altering the parameters of the checkpointing process upon the detection of a predetermined change in the real world environment.

5. A method as set forth in claim 4 wherein the step of altering the parameters of the checkpointing process further comprises the step of switching to an active checkpointing process if predetermined changes in the real world environment are detected.

6. A method as set forth in claim 5 wherein the real world environment includes both a data processing cluster having data processing resources required by the virtual machine and an external real world environment of the cluster.

7. A method as set forth in claim 6 wherein the predetermined change is one occurring in the external real world environment.

8. A system for managing a virtual machine implemented using real resources available in a data processing cluster, said system including:
   a. an availability policy store for storing a current availability policy for the virtual machine;
   b. an environment monitor for monitoring a real world environment of the data processing cluster;

c. a virtual machine monitor for altering the current availability policy stored in said availability policy store upon detection of predetermined changes in the monitored real world environment.

9. A system as set forth in claim 8 wherein the availability policy comprises a recovery policy defining actions to be taken upon detection of an unexpected predetermined change in the monitored real world environment.

10. A system as set forth in claim 9 wherein the availability policy comprises a migration policy defining actions to be taken upon detection of an expected predetermined change in the monitored real world environment.

11. A system as set forth in claim 10 further including logic for performing a checkpointing process defined by the availability policy and logic for altering the parameters of the checkpointing process upon the detection of a predetermined change in the monitored real world environment.

12. A system as set forth in claim 11 wherein the logic for altering the parameters of the checkpointing process further comprises logic for initiating an active checkpointing process if predetermined changes in the monitored real world environment are detected.

13. A system as set forth in claim 12 wherein the monitored real world environment extends to an external real world environment of the data processing cluster.

14. A system as set forth in claim 13 wherein the virtual machine monitor alters the current availability policy stored in said current availability store in response to a change in the external real word environment of the data processing cluster.

15. A computer program product comprising a computer usable storage medium having computer program instructions embodied thereon, said program instructions when loaded into and executed by a computer causing the computer to perform a method of managing a virtual machine comprising the steps of:

a. establishing an availability policy for the virtual machine;
b. monitoring a real world environment in which the virtual machine is implemented; and
c. altering the availability policy of the virtual machine upon the detection of predetermined changes in the real world environment.

16. A computer program product as set forth in claim 15 wherein the availability policy comprises a recovery policy defining actions to be taken upon detection of an unexpected predetermined change in the real world environment.

17. A computer program product as set forth in claim 16 wherein the availability policy comprises a migration policy defining actions to be taken upon detection of an expected predetermined change in the real world environment.

18. A computer program product as set forth in claim 17 wherein the availability policy comprises a migration policy defining actions to be taken upon detection of an expected predetermined change in the real world environment.

19. A computer program product as set forth in claim 18 further including program instructions for performing a checkpointing process defined by the availability policy and wherein the program instructions for altering the availability policy further includes program instructions for altering the parameters of the checkpointing process upon the detection of a predetermined change in the real world environment.

20. A computer program product as set forth in claim 19 wherein the program instructions for altering the parameters of the checkpointing process further includes program instructions for switching to an active checkpointing process if predetermined changes in the real world environment are detected.

* * * * *